Dec. 21, 1926.

W. L. AYERS 1,611,710

PUMP

Filed March 9, 1925  4 Sheets-Sheet 1

W. L. Ayers
INVENTOR

BY Victor J. Evans
ATTORNEY

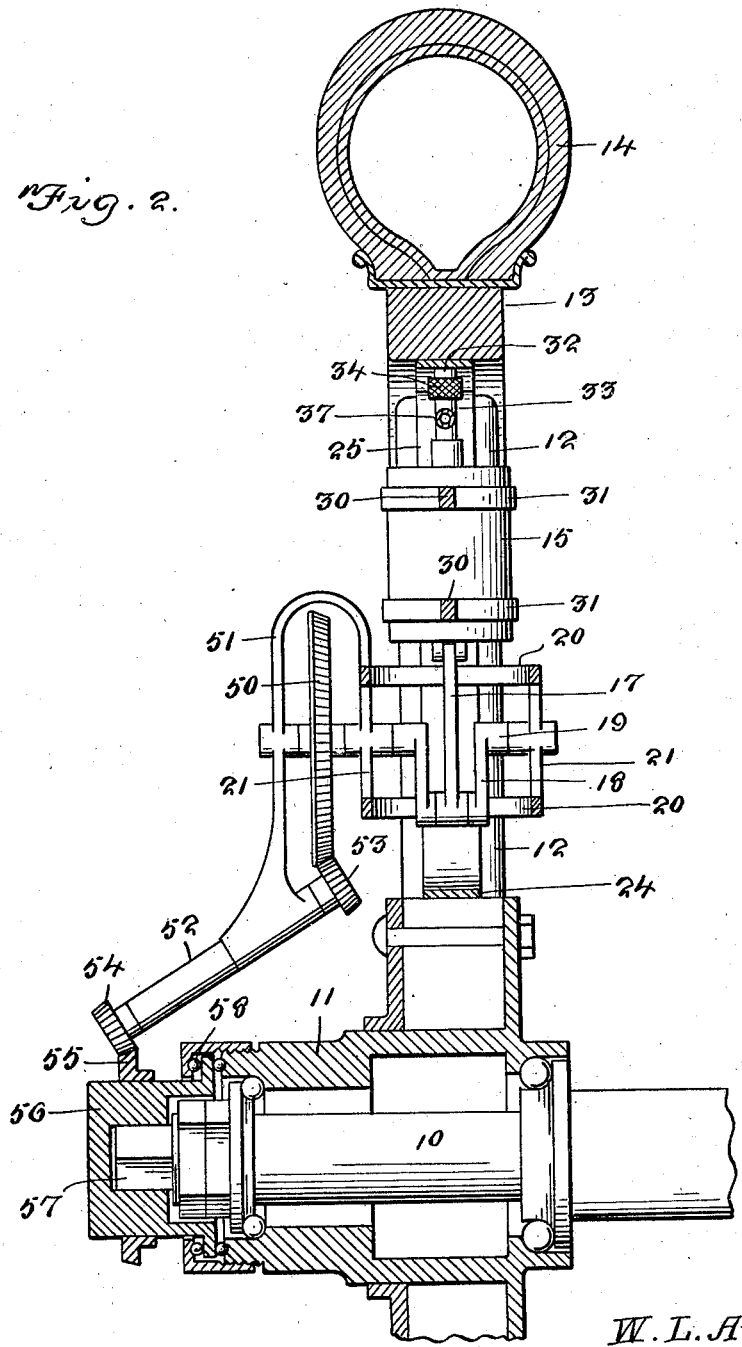

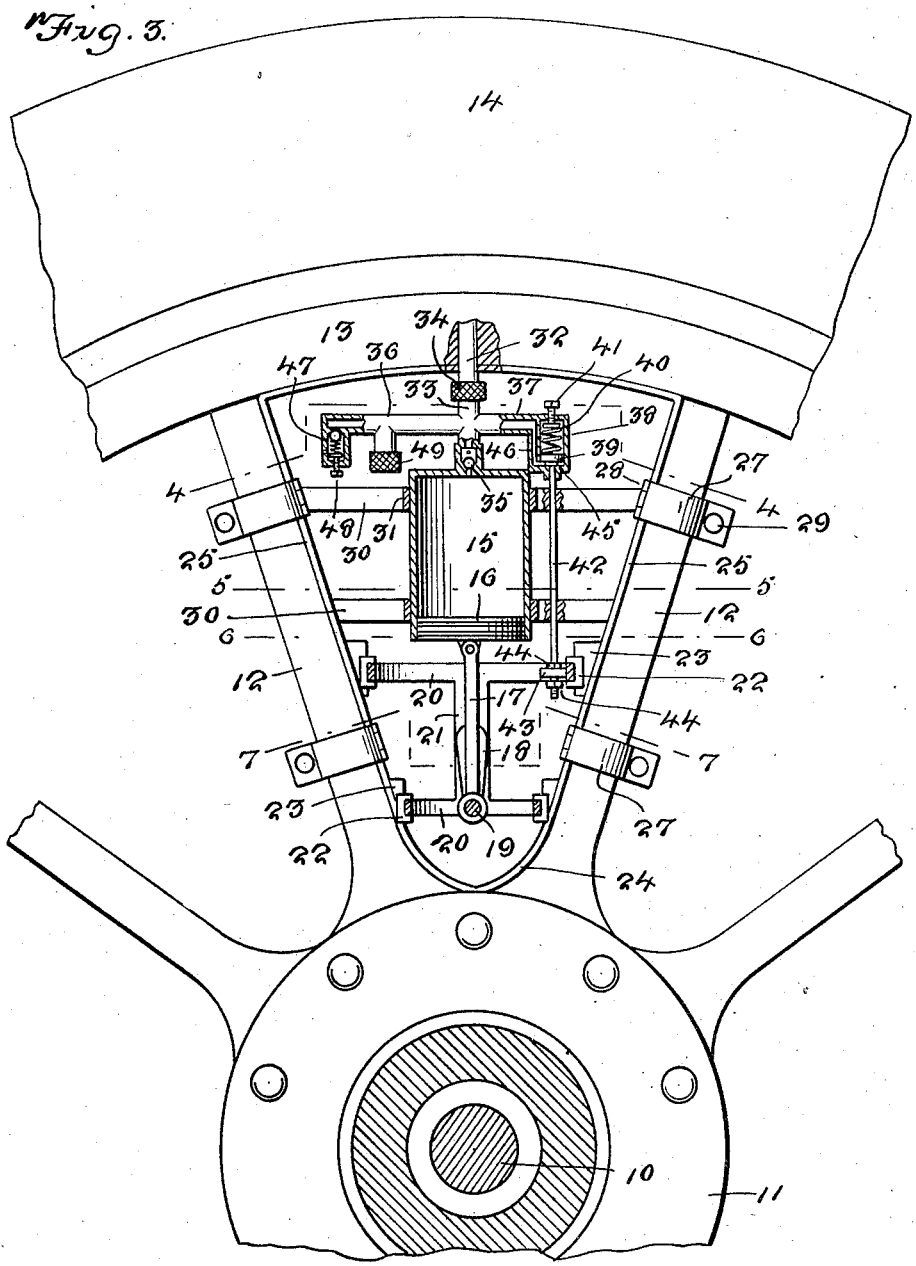

Dec. 21, 1926.
1,611,710
W. L. AYERS
PUMP
Filed March 9, 1925
4 Sheets-Sheet 4
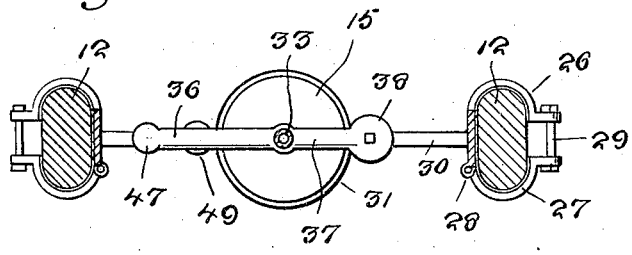
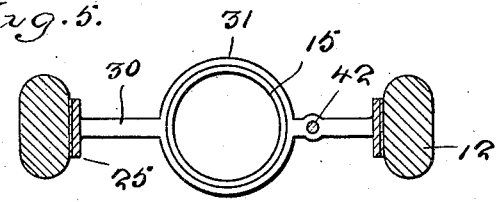
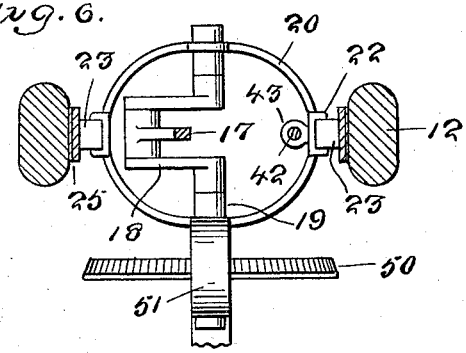
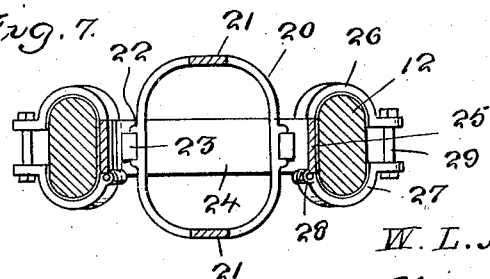

Patented Dec. 21, 1926.

1,611,710

UNITED STATES PATENT OFFICE.

WALTER L. AYERS, OF MARSHALL, TEXAS.

PUMP.

Application filed March 9, 1925. Serial No. 14,213.

This invention relates to improvements in devices for inflating pneumatic tires and has for an object the provision of automatically controlled means operated by the rotation of the wheels of an automobile for maintaining a predetermined air pressure within the tires.

Another object of the invention is the provision of means whereby the tire inflating means may be regulated so as to regulate the amount of air pressure within the tires.

More specifically stated, the invention comprises a normally inactive wheel carried pump which is operated by the rotation of a wheel to supply air under pressure to the wheel tire, provision being made for rendering the pump operating means active when the pressure in the tire reaches a predetermined degree and for automatically rendering the pump operating means inactive when pressure within the tire is increased to the desired amount.

With the above and other objects in view, the invention further includes the following novel features and details of construction, to be hereinafter more fully described, illustrated in the accompanying drawings and pointed out in the appended claims.

In the drawings:—

Figure 2 is a view taken at a right angle to Figure 1 approximately on line 2—2 of Figure 1.

Figure 3 is a fragmentary elevation partly in section.

Figure 4 is a sectional view taken on line 4—4 of Figure 3.

Figure 5 is a sectional view taken on line 5—5 of Figure 3.

Figure 6 is a view taken substantially on line 6—6 of Figure 3.

Figure 7 is a view taken substantially on line 7—7 of Figure 3.

Figure 1:
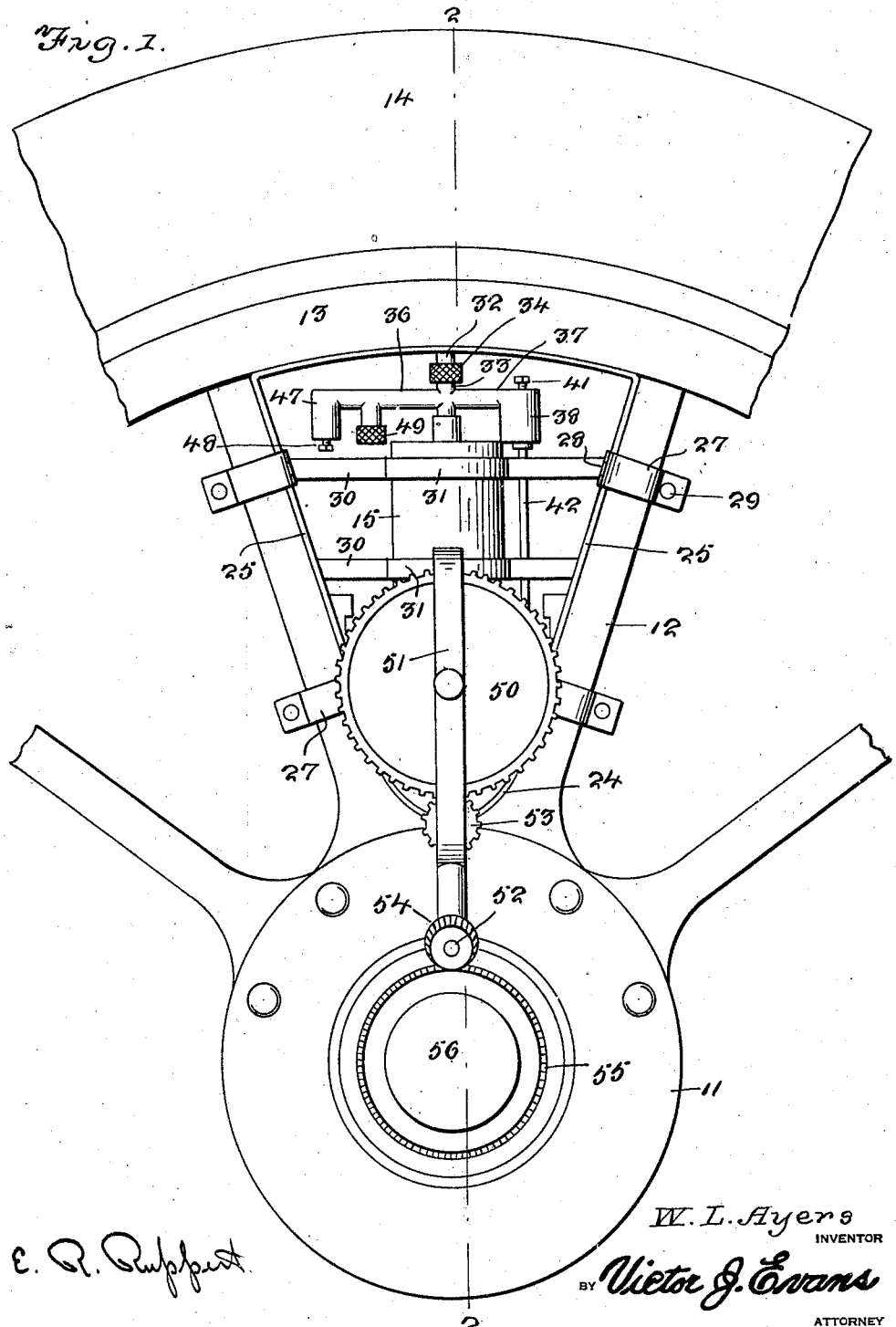
Figure 1 is a side elevation showing a portion of an automobile wheel with the invention applied.

Referring to the drawings in detail wherein like characters of reference denote corresponding parts, the reference character 10 indicates an axle spindle upon which is mounted a wheel hub 11, the latter having extending therefrom spokes 12 which connect with the rim 13, while mounted upon this rim is a pneumatic tire 14. All of the foregoing may be of any approved or desired construction, the invention being adapted for attachment to the spokes of a wheel of any character.

The inflating device which constitutes the present invention comprises a pump cylinder 15 and operating within this cylinder is a piston 16 whose connecting rod 17 is connected to the crank arm 18 of a shaft 19. This shaft 19 is mounted in a radially movable frame, the latter including spaced inner and outer annular members 20 which are connected by means of oppositely located radially disposed bars 21.

The members 20 carry oppositely located grooved slides 22 which operate over opposed guide lugs or flanges 23 which extend inwardly from a main frame 24.

This main frame 24 is adapted to fit between adjacent spokes 12 of the wheel and its relatively inclined arms 25 which extend along and engage the spokes are connected at their opposite ends as shown in Figure 3 of the drawings. Extending from the arms 25 and engageable around the spokes 12 are spaced clamps which include clamping members 26 rigid with the arms 25 and clamping members 27 which are hingedly secured to said arms 25, the hinges being shown at 28 in Figures 3 and 4 of the drawings. The clamping members 26 and 27 are detachably connected by bolts 29 so that the main frame 24 will be securely held in place.

Extending from the arms 25 of the main frame are spaced bars 30. These bars are rigid with the main frame and are provided with annular cylinder engaging bands 31 which securely hold the cylinder 15 in position.

The cylinder is in communication with the usual valve 32 of a pneumatic tire by means of a pipe or conduit 33, the latter being connected to the valve 32 by a coupling member 34. Previous to connecting the coupling member 34, the usual "insides" of the valve 32 are removed. A check valve 35 is included in the pipe 33 so as to prevent the return of air into the cylinder 15.

Extending from the pipe 33 in opposite directions are pipes 36 and 37, the latter being provided with a relatively small cylinder 38 in which is positioned a plunger 39. Movement of the plunger in one direction is yieldingly resisted by a spring 40, the tension of which is regulated by an adjusting screw 41. The plunger 39 has extending therefrom a stem 42 which passes through guide openings provided in the bars 30 and has its outer end secured to a lug 43 which extends from one of the annular members 20 of the movable frame. Stops 44 are mounted upon the stem 42 of the plunger 39. A spacing collar 45 is mounted upon the stem 42 adjacent the plunger 39 so as to space the plunger from the adjacent end of the cylinder 38, this end of the cylinder being in communication with the pipe 37 by a passage 46.

The pipe 36 is provided at its outer end with a pressure relief valve 47 whose spring may be tensioned by an adjusting nut 48. A coupling member 49 extends from the pipe 36 for engagement by the usual valve carried by the hose of an air pump, so that if desired the tire may be inflated at a service station in the usual manner.

The shaft 19 has secured upon its outer end a beveled gear 50, the latter being mounted in bearings carried by an extension 51 of the slidable frame. This extension 51 also provides bearings for a shaft 52 which has secured upon its opposite ends pinions 53 and 54. This first mentioned pinion is engaged by the gear 50, while the pinion 54 is adapted to engage a gear 55 which is mounted upon a stationary hub cap 56. In order to hold the cap 56 stationary it engages a rectangular extension 57 carried at the outer end of the axle spindle 10, the latter being also stationary. Anti-friction bearings 58 are provided between the stationary hub cap and the hub.

Normally, the pinion 54 is disengaged from the gear 55 so that the pump will be inactive. The pinion is held in this position by pressure of air upon the plunger 39, air from the tire 14 passing through the passage 46 and exerting pressure upon the end of the cylinder 38 and the adjacent face of the plunger 39. When air within the tire 14 falls to a predetermined pressure regulated by the set screw 41, the action of the spring 40 upon the plunger 39 will force the plunger outward so as to slide the movable frame radially and engage the pinion 54 with the gear 55. Rotation of the vehicle wheel will then rotate the crank shaft 19 due to the travel of the pinion 54 around the stationary gear 55. As soon as the desired pressure is within the tire 14, air passing through the passage 46 will act upon the plunger 39 and move the latter against the action of the spring 40 so as to move the frame 20 radially in an opposite direction and disengage the pinion 54 from the gear 55.

The invention is susceptible of various changes in its form, proportions and minor details of construction and the right is herein reserved to make such changes as properly fall within the scope of the appended claims.

Having described the invention what is claimed is:

1. A pneumatic tire inflating device comprising in combination with a vehicle wheel, a substantially triangular-shaped frame adapted to be arranged between two adjacent spokes of the wheel and conform to the curvature of the adjacent portion of the felly thereof, a cylinder arranged centrally of said frame, spaced bands surrounding said cylinder, arms radiating from said bands at diametrically opposite points and in the direction of said spokes, clamping members hingedly mounted on the outer end of each arm and adapted to embrace the adjacent spokes and support the cylinder in fixed relation thereto, an auxiliary frame arranged within the first mentioned frame and mounted for sliding movement beneath the cylinder, a crank shaft mounted in the auxiliary frame, a piston operating in the cylinder and connected with said shaft, a stationary gear mounted adjacent the wheel, gearing carried by the slidable frame and operated by said shaft, and adapted to engage the stationary gear, means controlled by the pressure of air within the tire to hold the frame carried gearing normally disengaged from the stationary gear, and means for moving the frame and gearing carried thereby into engagement with the stationary gear when the pressure of air in the tire is reduced.

2. A pneumatic tire inflating device comprising in combination with a wheel, of a substantially triangular-shaped frame arranged between two adjacent spokes of the wheel, a cylinder positioned within the frame, bands surrounding the cylinder, arms radiating from said bands in the direction of said spokes, two-part clamps hingedly mounted on the outer ends of said arms and adapted to embrace the adjacent sides of said frame and spokes to hold the frame and cylinder fixed on the wheel, a pipe establishing communication between the cylinder and valve stem of the tire, auxiliary pipes projecting laterally from the first mentioned pipe, an auxiliary frame slidable on the first-mentioned frame beneath the cylinder, a crank shaft journaled in the auxiliary frame, a piston operating within the cylinder and connected with said crank shaft, a stationary gear, gearing carried by the slidable frame and operated by said shaft and adapted to engage the stationary gear, pressure actuated means associated with one of the laterally disposed auxiliary pipes for holding the frame carried gearing disengaged from the stationary gear, and adjustable to vary the pressure required to actuate said means, means for moving the frame and its gearing into engagement with the stationary gear when the predetermined pressure of the tire is reduced, and a normally seated valve arranged in the other auxiliary pipe for the purpose specified.

In testimony whereof I affix my signature.

WALTER L. AYERS.